United States Patent [19]
Foran et al.

[11] Patent Number: 5,490,240
[45] Date of Patent: Feb. 6, 1996

[54] SYSTEM AND METHOD OF GENERATING INTERACTIVE COMPUTER GRAPHIC IMAGES INCORPORATING THREE DIMENSIONAL TEXTURES

[75] Inventors: James L. Foran, Mel Peatos; John S. Montrym, Los Altos; Robert A. Drebin, Mountain View; Gregory C. Buchner, Sunnyvale, all of Calif.

[73] Assignee: Silicon Graphics, Inc., Mountain View, Calif.

[21] Appl. No.: 88,716

[22] Filed: Jul. 9, 1993

[51] Int. Cl.$^6$ .................................................. G06T 15/40
[52] U.S. Cl. .............................................................. 395/130
[58] Field of Search ...................................... 395/130, 125, 395/126, 128, 129, 132, 131

[56] References Cited

U.S. PATENT DOCUMENTS

| | | | |
|---|---|---|---|
| 4,945,500 | 7/1990 | Deering | 395/134 |
| 4,974,176 | 11/1990 | Buchner et al. | |
| 5,097,427 | 3/1992 | Lathrop et al. | 395/130 |
| 5,307,450 | 4/1994 | Grossman | 395/123 |

OTHER PUBLICATIONS

Stephen A. Zimmerman, "Applying Frequency Domain Constructs To A Broad Spectrum of Visual Simulation Problems", 1987 Image Conference IV Proceedings, Jun. 1987.

Kenneth R. Castleman, *Digital Image Processing*, Chapter 8, "Geometric Operations", pp. 110–115, Prentice-Hall (1979).

William Dungan, Jr. et al., "Texture Tile Considerations for Raster Graphics", pp. 130–136, SIGGRAPH 1978 Proceedings, vol. 12 #3, Aug. 1978.

Darwyn R. Peachey, "Solid Texturing of Complex Surfaces" SIGGRAPH, vol. 19, No. 3, pp. 279–286, 1985.

*Primary Examiner*—Heather R. Herndon
*Assistant Examiner*—Cliff Nguyen Vo
*Attorney, Agent, or Firm*—Sterne, Kessler, Goldstein & Fox

[57] ABSTRACT

A system and method of interactively generating computer graphic images for incorporating three dimensional textures. The method of the present invention includes defining an orientation of a polygon relative to a plurality of three dimensional (3D) texture data sets, determining a level of detail of a pixel associated with the polygon, and selecting a first 3D texture data set and a second 3D texture data set from the plurality of 3D texture data sets in accordance with the pixel level of detail. The method also includes mapping the pixel to a first position within the first 3D texture data set and to a second position within the second 3D texture data set in accordance with the orientation, and generating a display value for the pixel in accordance with the mapping of the pixel to the first and second positions.

29 Claims, 8 Drawing Sheets

SYSTEM AND METHOD OF GENERATING INTERACTIVE COMPUTER GRAPHIC IMAGES INCORPORATING THREE DIMENSIONAL TEXTURES

CROSS-REFERENCE TO OTHER APPLICATIONS

The following application of common assignee contains some common disclosure, and is believed to have an effective filing date identical with that of the present application:

U.S. patent application entitled "A System and Method for Sharpening Texture Imagery in Computer Generated Interactive Graphics", by Robert A. Drebin and Gregory C. Buchner, U.S. Ser. No. 08/088,352 Attorney Docket No. 15-4-100.00 (1452.0130000), incorporated herein by reference in its entirety.

BACKGROUND OF THE INVENTION

1. Field of the Invention

The present invention relates generally to texture imagery in computer generated interactive graphics, and more particularly to three dimensional texture imagery in computer generated interactive graphics.

2. Related Art

A typical computer generated image comprises a plurality of polygons. Each polygon may contribute to one or more pixels of the final image (a pixel is a picture element of a display means), wherein each of the pixels may have a unique color based on such attributes as intrinsic color, lighting (specular highlights, shading, shadows, etc.), atmospheric effects (fog, haze, etc.), and texture. As is well known, textures are conventionally used to provide visual detail for polygon surfaces.

Conventional computer image generation systems store varying levels of detail (LOD) of texture data. LOD is described in many publicly available documents, such as "Texture Tile Considerations for Raster Graphics", William Dugan, Jr., et al., SIGGRAPH 1978 Proceedings, Vol. 12#3, Aug. 1978.

Figure 1A:
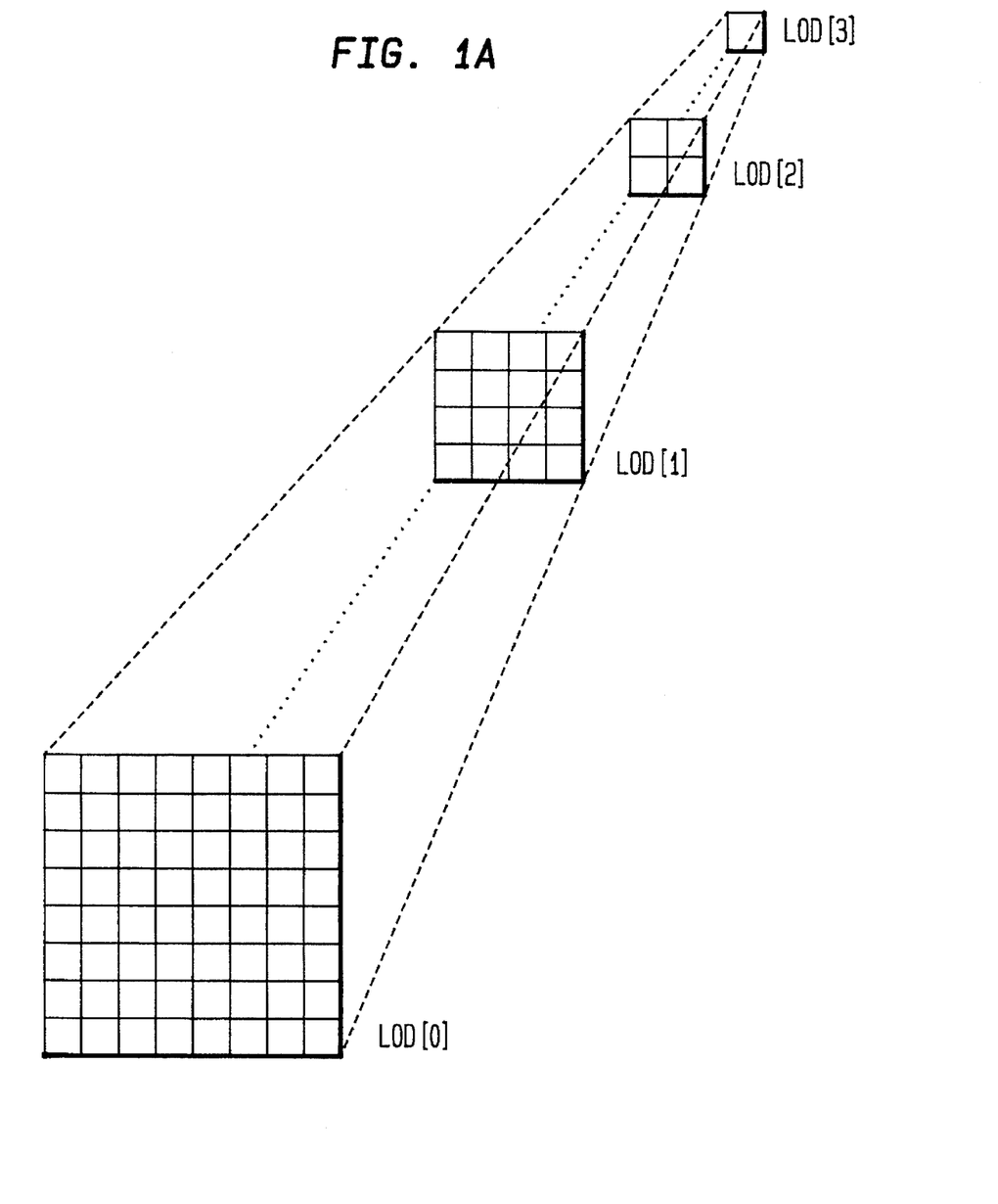
FIG. 1A illustrates the relationship between images having different levels of detail.

FIG. 1A illustrates two dimensional LODs stored for a particular image. LOD[0], also called the base texture, is shown in FIG. 1 as being a two dimensional 8×8 texture. The term maplevel$_n$ can be used synonomously with LOD[N], where N is an integer. The base texture LOD[0] is the highest resolution texture that is conventionally stored. LOD n represents the base texture LOD[0] magnified by a factor of $2^{-n}$ (other magnification factors could also be used). Thus, LOD[1] is a two dimensional 4×4 texture, LOD[2] is a two dimensional 2×2 texture, and LOD[3] is a two dimensional 1×1 texture.

Most conventional computer graphics systems support two dimensional textures, but not three dimensional textures. A typical texture technique employed in such conventional computer graphics systems is to map a two dimensional grid of texture data to an initially constant color polygon. Systems which support two dimensional textures, but not three dimensional textures, are flawed because they are not capable of solving the frequently-occurring problems wherein data is not planar, but rather is known as a volume. Information resulting from a magnetic resonance imaging (MRI) scan is an example of a volume data set wherein numerous "slices" of data are collected, with all of the slices stacking up to create a volume of data representing the anatomical structure of the scanned area.

A prior approach for supporting three dimensional textures was presented in "Solid Texturing of Complex Surfaces" by Darwyn R. Peachey, Siggraph '85 Proceedings, Volume 19, Number 3, pages 279-286 (1985), which is herein incorporated by reference in its entirety. However, this prior approach is flawed because the concepts discussed therein cannot be implemented to produce a computer graphics system which processes three dimensional textures at interactive rates.

Thus, what is required is a system and method of processing three dimensional textures at interactive rates.

SUMMARY OF THE INVENTION

The present invention is directed to a system and method of interactively generating computer graphic images incorporating three dimensional textures. The system of the present invention includes means for defining an orientation of a polygon relative to a plurality of three dimensional (3D) texture data sets, wherein each of the 3D texture data sets are at a distinct level of detail. The system of the present invention also includes level of detail determining means for determining a level of detail of a pixel associated with the polygon, and texture data set selecting means for selecting a first 3D texture data set and a second 3D texture data set from the plurality of 3D texture data sets in accordance with the pixel level of detail. The selection by the texture data set selecting means is such that the first 3D texture data set represents a magnification of the pixel, and the second 3D texture data set represents a minification of the pixel. Pixel mapping means maps the pixel to a first position within the first 3D texture data set and to a second position within the second 3D texture data set in accordance with the orientation. The system of the present invention further includes pixel value generating means for generating a display value for the pixel in accordance with the mapping of the pixel to the first and second positions.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a system and method of generating interactive computer graphic images incorporating three dimensional textures. More particularly, the present invention is directed to a system and method of processing three dimensional textures at interactive rates. The terms "three dimensional textures", "texture volumes", and "three dimensional texture data sets" are used interchangeably herein. Also, the abbreviation "3D" is sometimes substituted herein for the term "three dimensional".

Figure 1B:
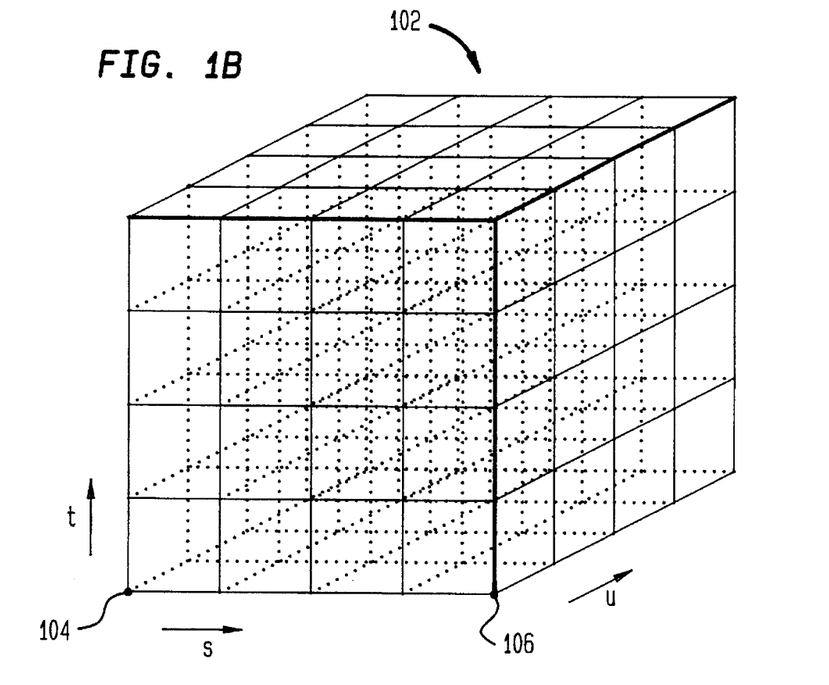
FIGS. 1B and 2 illustrate three dimensional data sets used for describing the operation of the present invention.
Figure 2:
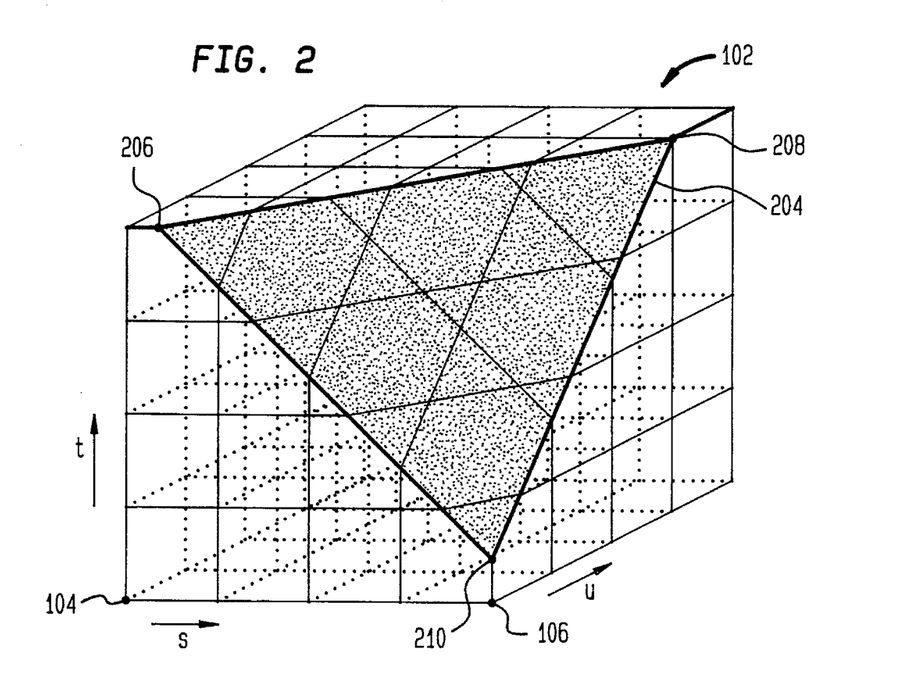

The present invention enables three dimensional texture data sets to be sampled on displayed surfaces. Through use of the system and method of the present invention, many approaches can be employed to render the displayed image. FIG. 1B illustrates a 3D texture data set 102. Note that the 3D texture data set 102 has three axes: s, t, and u. For illustrative purposes, assume that the 3D texture data set 102 represents a block of wood. In accordance with the present invention, an image of the internal structure of the wood block is generated by "slicing" the 3D texture data set 102 with an opaque polygon, wherein the image of the internal structure of the wood block generated by the present invention is along the plane of the opaque polygon. This is shown in FIG. 2, wherein the 3D texture data set 102 has been sliced by an opaque polygon 204.

Another approach for rendering the displayed image is to draw a multitude of partially transparent polygons through the 3D texture data set 102 at a given orientation (for example, parallel to the viewing plane) to thereby reveal the 3D structure of the 3D texture data set 102. In accordance with the present invention, the 3D texture data set 102 is interactively viewed from any orientation by changing the positions of the polygons relative to the 3D texture data set 102.

Another approach for rendering the displayed image is to use the third coordinate to represent time to thereby render time-varying images on a surface of the 3D texture data set 102. Thus, the present invention can be used to achieve animation.

The present invention shall now be described in detail with reference to FIG. 3, which presents a flowchart for sampling a 3D texture data set using a polygon in accordance with a preferred embodiment of the present invention. Referring to FIG. 2, for example, the darkened area of the 3D texture data set 102 represents that part of the 3D texture data set 102 which has been sampled using the polygon 204.

As will be appreciated by persons skilled in the relevant art, a particular set of display pixels is associated with the polygon that is used to sample the 3D texture data set. For each pixel of the polygon, the present invention (as embodied in the flowchart of FIG. 3) operates to determine the value (for example, the intensity value, or the red/green/blue value) of the pixel based on the pixel's projection into the 3D texture data set.

Figure 3:
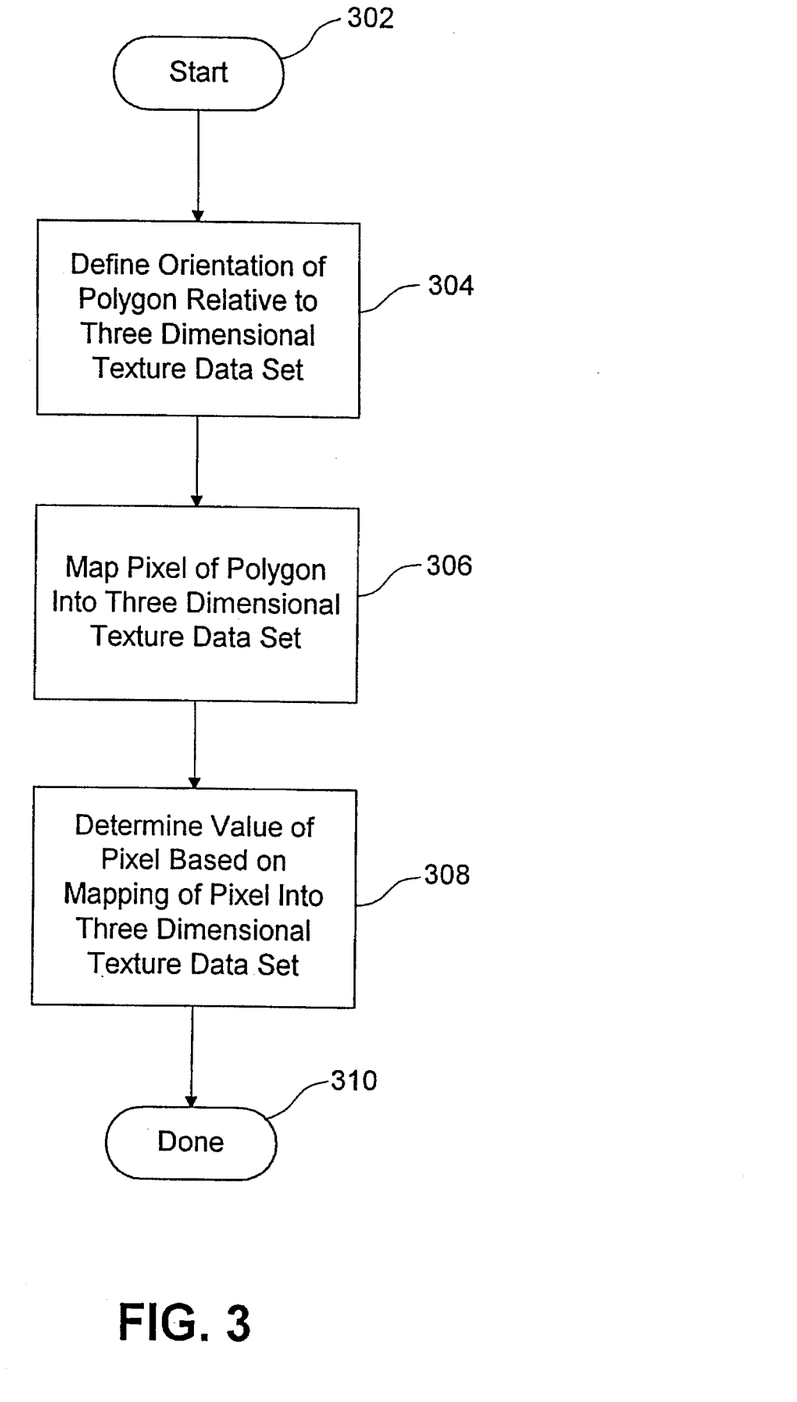
FIGS. 3–5 illustrate flow charts representing the operation of embodiments of the present invention.

Referring now to FIG. 3, in step 304 an orientation of the polygon (which is being used to sample the 3D texture data set) relative to the 3D texture data set is defined. Step 304 shall now be described in detail.

The dimensions of all 3D texture data sets are preferably normalized such that the smallest value in any dimension is set equal to 0.0, and the largest value in any dimension is set equal to 1.0. For example, consider the s dimension of the 3D texture data set 102 in FIG. 1B and 2, wherein the smallest value of the s dimension is labelled 104 and the largest value of the s dimension is labelled 106. In accordance with a preferred embodiment of the present invention, the smallest value 104 of the s dimension is set equal to 0, and the largest value 106 of the s dimension is set equal to 1. All intermediate values of the s dimension are scaled accordingly.

Each vertex of the polygon (which is being used to sample the 3D texture data set) is preferably defined using a triple of texture coordinates, wherein each triple is in the form: (s,t,u), and wherein each texture coordinate is preferably assigned a value from 0 to 1. Since the texture coordinates of the polygon vertices are assigned values from 0 to 1, the polygon vertices map directly to the 3D texture data set. This is true for all levels of detail. For example, the polygon 204 in FIG. 2 has vertices 206, 208, and 210. Vertex 206 has the following (approximate) texture coordinates: (0.125,1.0,0.0). Vertex 208 has the following (approximate) texture coordinates: (1.0,1.0,0.75). Vertex 210 has the following (approximate) texture coordinates: (1.0,0.125,0.0). These texture coordinates of the vertices 206, 208, 210 of the polygon 204 are the same no matter the level of detail of the 3D texture data set 102.

In accordance with a preferred embodiment of the present invention, during step 304 a user defines an orientation of the polygon (which is being used to sample the 3D texture data set) relative to the 3D texture data set by specifying the texture coordinates of the vertices of the polygon. The format of the vertex texture coordinates is as described above. Alternatively, the orientation of the polygon is automatically defined by retrieving texture coordinates of the vertices of the polygon from a storage device. Other schemes for interactively defining the orientation of the polygon without real-time interaction with a user will be apparent to persons skilled in the relevant art.

As discussed above, a particular set of display pixels is associated with the polygon which is being used to sample the 3D texture data set. Systems and procedures for selecting and associating pixels with polygons are well known, and are discussed in many publicly documents, such as "A Parallel Algorithm for Polygon Rasterization" by Juan Pineda, Siggraph '88 Proceedings, Volume 22, Number 4, pages 17–20 (1988). Any one of these well known systems and procedures may be used in connection with the present invention.

As also discussed above, for each pixel of the polygon, the present invention operates to determine the value (for example, the intensity value, or the red/green/blue value) of the pixel based on the pixel's projection into the 3D texture data set. Such operation of the present invention is embodied in steps 306 and 308 of FIG. 3. For simplicity purposes, steps 306 and 308 are described below with respect to a single pixel of the polygon. It should be understood that steps 306 and 308 are performed for each pixel of the polygon.

In step 306, a particular pixel of the polygon is mapped into the 3D texture data set. In other words, the texture coordinates (S,T,U) of the pixel are determined in step 306. The operation of step 306 shall now be described in detail with reference to FIG. 7, which illustrates a polygon 702 (used to sample the 3D texture data set) having vertices $V_0$, $V_1$, $V_2$. The pixel of the polygon being mapped into the 3D texture data set is denoted by P.

Figure 7:
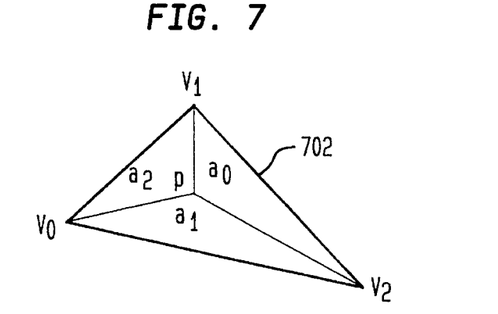
FIG. 7 illustrates a polygon used for describing the operation of the present invention.

First, the scaled screen-space 3D texture coordinates (S/w, T/w, U/w) at each vertex $V_0$, $V_1$, $V_2$ of the polygon 702 are calculated as shown below:

$$S_n/W_n = (\text{Soriginal}_n * \text{Texsize}_s)/w_n \qquad (\text{Eq. 1})$$

$$T_n/W_n=(\text{Toriginal}_n*\text{Texsize}_T)/W_n \quad \text{(Eq. 2)}$$

$$U_n/W_n=(\text{Uoriginal}_n*\text{Texsize}_U)/W_n \quad \text{(Eq. 3)}$$

where $\text{Soriginal}_n$, $\text{Toriginal}_n$, and $\text{Uoriginal}_n$ are the texture coordinates at the polygon vertex n where the range from 0.0 to 1.0 exactly covers the full texture map. $\text{Texsize}_S$, $\text{Texsize}_T$, and $\text{Texsize}_U$ are the dimensions of LOD[0] of the 3D texture data set in the S, T, and U axes, respectively. $1/W_n$ represents a perspective correction term which compensates for the well-known phenomenon that linear relationships in object space are not linear in screen space. It is noted that the terms "object-space" and "screen-space" are well known to persons skilled in the relevant art. The perspective correction term 1/w is well known and is assumed to be provided to the system of the present invention prior to execution of step 306 using well-known methods.

Scaled screen-space 3D texture coordinates (S/w, T/w, U/w) and perspective correction term 1/w at pixel P with screen-space coordinates (x,y) are then calculated given (S/w, T/w, U/w) and 1/w at the three polygon vertices $V_0$, $V_1$, $V_2$ as shown below:

$$a_0 = \frac{\text{area}(V_1V_2P)}{\text{area}(V_0V_1V_2)} = \frac{(x_2-x)(y_1-y)-(x_1-x)(y_2-y)}{(x_2-x_0)(y_1-y_0)-(x_1-x_0)(y_2-y_0)} \quad \text{(Eq. 4)}$$

$$a_1 = \frac{\text{area}(V_2V_0P)}{\text{area}(V_0V_1V_2)} = \frac{(x_0-x)(y_2-y)-(x_2-x)(y_0-y)}{(x_2-x_0)(y_1-y_0)-(x_1-x_0)(y_2-y_0)} \quad \text{(Eq. 5)}$$

$$a_2 = \frac{\text{area}(V_0V_1P)}{\text{area}(V_0V_1V_2)} = \frac{(x_1-x)(y_0-y)-(x_0-x)(y_1-y)}{(x_2-x_0)(y_1-y_0)-(x_1-x_0)(y_2-y_0)} \quad \text{(Eq. 6)}$$

Scaled object-space 3D texture coordinates (S,T,U) for the pixel P may then be calculated given scaled screen-space 3D texture coordinates (S/w, T/w, U/w) and perspective correction term 1/w at pixel P:

$$S=(S/w)/(1/w) \quad \text{(Eq. 11)}$$

$$T=(T/w)/(1/w) \quad \text{(Eq. 12)}$$

$$U=(U/w)/(1/w) \quad \text{(Eq. 13)}$$

The LOD of the pixel P given scaled object space 3D texture coordinates (S,T,U) at pixel P is calculated as follows:

$$ds1=|S(x,y)-S(x+1,y)| \quad \text{(Eq. 14)}$$

$$ds2=|S(x,y)-S(x,y+1)| \quad \text{(Eq. 15)}$$

$$dt1=|T(x,y)-T(x+1,y)| \quad \text{(Eq. 16)}$$

$$dt2=|T(x,y)-T(x,y+1)| \quad \text{(Eq. 17)}$$

$$du1=|U(x,y)-U(x+1,y)| \quad \text{(Eq. 18)}$$

$$du2=|U(x,y)-U(x,y+1)| \quad \text{(Eq. 19)}$$

$$\text{LOD}=\max(ds1, ds2, dt1, dt2, du1, du2) \quad \text{(Eq. 20)}$$

$$\text{maplevel}_{fine}=\max(0,\text{int}(\log_2(\text{LOD}))) \quad \text{(Eq. 21)}$$

$$\text{maplevel}_{coarse}=\text{maplevel}_{fine}+1 \quad \text{(Eq. 22)}$$

$$\text{maplevelfraction}=(\text{LOD}>>\text{maplevel}_{fine})-1.0 \quad \text{(Eq. 23)}$$

In the above equations, $\text{maplevel}_{fine}$ represents a LOD of equal or higher resolution than the LOD of the pixel P, and $\text{maplevel}_{coarse}$ represents a LOD of lower resolution than the LOD of the pixel P. As described below, in one embodiment of the present invention $\text{maplevelt}_{fine}$ is used to select a 3D texture data set that represents a slight magnification of the LOD of the pixel (the LOD of the selected 3D texture data set is $\text{maplevel}_{fine}$), and $\text{mapleveL}_{coarse}$ is used to select a 3D texture data set that represents a slight minification of the LOD of the pixel (the LOD of the selected 3D texture data set is $\text{maplevel}_{coarse}$). maplevelfraction represents the fractional portion of the LOD of the pixel P.

The minimums of the original map level and the texture size are determined as follows:

$$\text{s level}_{fine}=\min(\text{maplevel}_{fine}, s_{size}) \quad \text{(Eq. 24)}$$

$$\text{t level}_{fine}=\min(\text{maplevel}_{fine}, t_{size}) \quad \text{(Eq. 25)}$$

$$\text{u level}_{fine}=\min(\text{maplevel}_{fine}, u_{side}) \quad \text{(Eq. 26)}$$

$$\text{s level}_{coarse}=\min(\text{maplevel}_{coarse}, s_{size}) \quad \text{(Eq. 27)}$$

$$\text{t level}_{coarse}=\min(\text{maplevel}_{coarse}, t_{size}) \quad \text{(Eq. 28)}$$

$$\text{u level}_{coarse}=\min(\text{maplevel}_{coarse}, u_{size}) \quad \text{(Eq. 29)}$$

Figure 5:
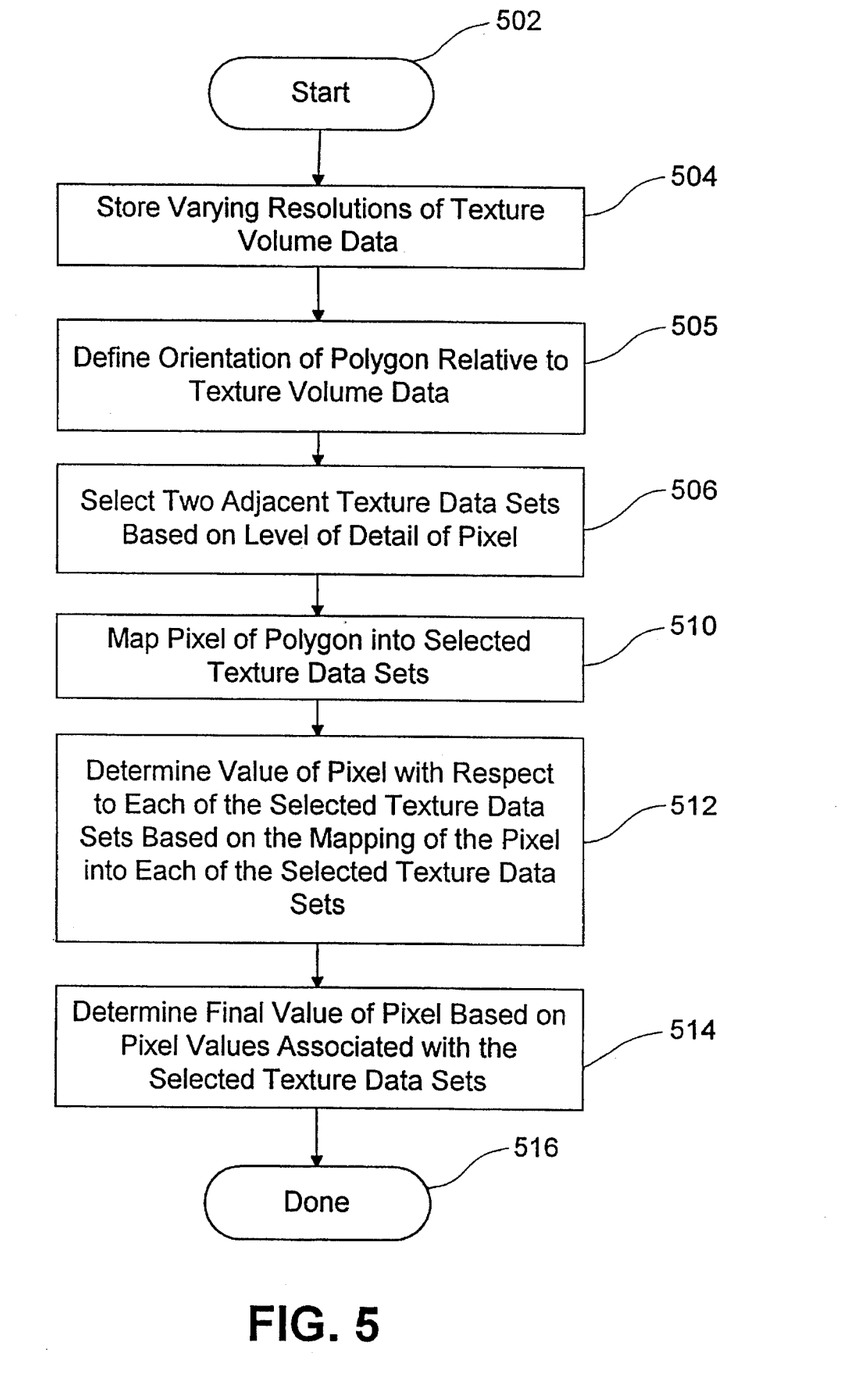

Note that the above calculation of two sets of coordinate values applies to the embodiment of the present invention represented in FIG. 5. In the embodiment represented in FIG. 3, only one set of coordinate values are calculated for the pixel P.

In order to prevent overflowing, the coordinate values of the pixel P are preferably shifted in accordance with the minimums of the original map level and the texture size calculated above as follows (the symbol ">>" represents a right shift operation—in essence, the coordinates are being shifted to a lower resolution):

$$S_{fine}=S>>\text{S level}_{fine} \quad \text{(Eq. 30)}$$

$$t_{fine}=t>>\text{t level}_{levelfine} \quad \text{(Eq. 31)}$$

$$u_{fine}=u>>\text{u level}_{fine} \quad \text{(Eq. 32)}$$

$$s_{coarse}=s>>\text{s level}_{coarse} \quad \text{(Eq. 33)}$$

$$t_{coarse}=t>>\text{t level}_{coarse} \quad \text{(Eq. 34)}$$

$$u_{coarse}=u>>\text{u level}_{coarse} \quad \text{(Eq. 35)}$$

Figure 4:
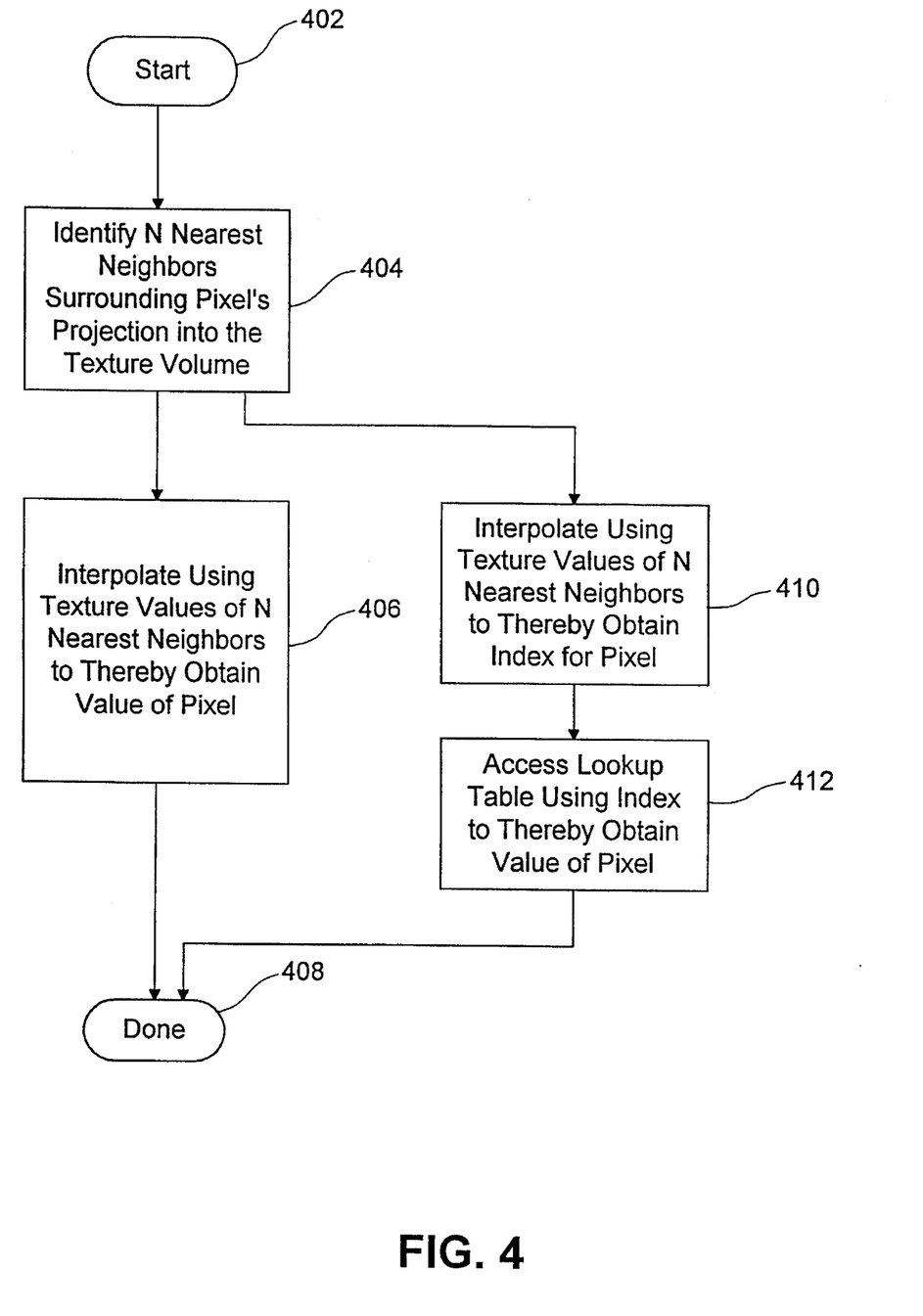
Figure 6A:
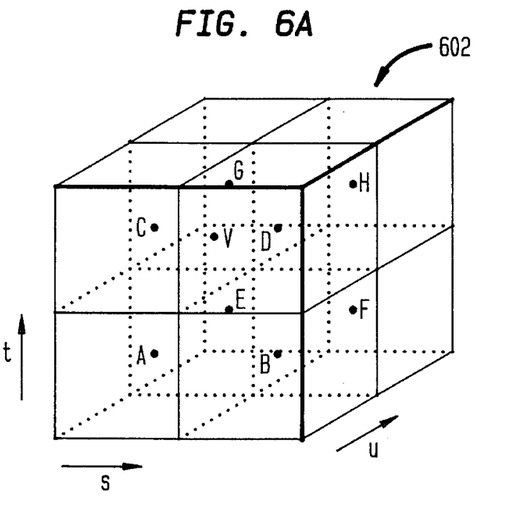
FIG. 6A illustrates an additional three dimensional data set used for describing the operation of the present invention.
Figure 6B:
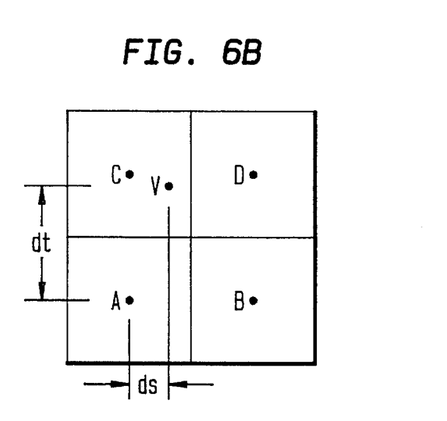
Figure 6C:
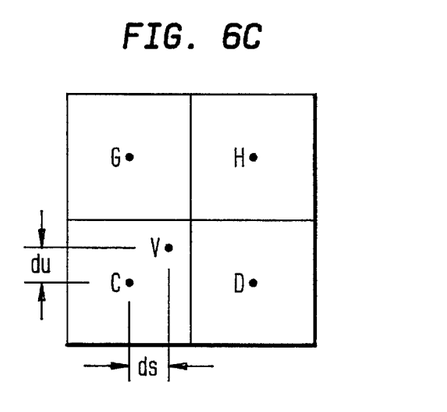
Figure 6D:
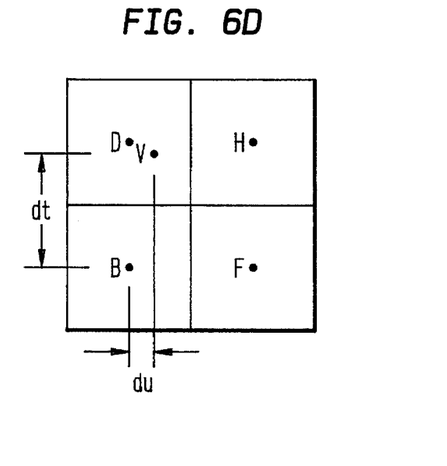

Referring again to FIG. 3, after the texture coordinates (S,T,U) of the pixel are determined in step 306, step 308 is performed. In step 308, the value (for example, the intensity value, or the red/green/blue value) of the pixel is determined based on the pixel's mapping into the 3D texture data set (as determined in step 306). The operation of step 308 shall now be described in detail with reference to FIGS. 4 and 6A–6D. FIG. 4 presents a flowchart representing the preferred operation of the present invention while performing step 308 in the flowchart of FIG. 3. FIG. 6A is a 2×2×2 texture data set 602 and is used to illustrate the operation of the present invention while performing the steps of the flowchart in FIG. 4 (alternatively, FIG. 6A illustrates a 2×2×2 portion of a larger texture data set). FIGS. 6B, 6C, and 6D present a front view, a top view, and a side view, respectively, of the texture data set 602 in FIG. 6A.

The 3D texture data set 602 in FIG. 6A includes 8 texels (also called herein "texture elements" and "texture data samples"). These texels have the values A, B, C, D, E, F, G, and H. V represents the pixel of the polygon as mapped into the 3D texture data set 602 (during step 306).

If V mapped to the exact volumetric center of one of the texels of the 3D texture data set 602, then V could be set to the value of that texel. As is usually the case, however, V does not map to the volumetric center of any of the texels in the 3D texture data set 602. Thus, in accordance with a preferred embodiment of the present invention, the value of V is set as a function of the respective distances separating V from the texels which surround V. The closer V is to a particular texel of the 3D texture data set 602, the greater weight that particular texel is afforded in setting the value of V. This is described in detail below.

Referring now to FIG. 4, in step 404 the N texels closest to V are identified. Preferably, N equals 8, although the use of values other than 8 for N falls within the scope of the present invention. In the preferred embodiment, the 8 texels selected during step 404 are those 8 texels forming a 2×2×2 cube wherein V is an approximate volumetric center. In the example of FIG. 4, the 8 texels selected during step 404 are those texels having respective values of A, B, C, D, E, F, G, and H.

In accordance with a preferred embodiment of the present invention, step 406 is executed after the completion of step 404. In step 406, the values of the texels identified in step 404 are interpolated to generate the value of the pixel. The interpolation operation of step 406 acts to anti-alias the image. Preferably, trilinear interpolation is performed in step 406. With regard to the example of FIG. 6A, the value of V is determined using trilinear interpolation as shown in Equation 36:

$$V = A * (1-ds)(1-dt)(1-du) + \\ B * (ds)(1-dt)(1-du) + \\ C * (1-ds)(dt)(1-du) + \\ D * (ds)(dt)(1-du) + \\ E * (1-ds)(1-dt)(du) + \\ F * (ds)(1-dt)(du) + \\ G * (1-ds)(dt)(du) + \\ H * (ds)(dt)(du)$$

(Eq. 36)

wherein ds, dt, and du are given values as shown in FIGS. 6B–6D.

Trilinear interpolation is well known, and is described in a number of publicly available documents, such as *Digital Image Processing* by Kenneth R. Castleman, Prentice-Hall (1979). Higher-order interpolation schemes can alternatively be used to calculate V. Such higher-order interpolation schemes are well known, and are described in a number of publicly available documents, such as *Digital Image Processing*, cited above.

In accordance with an alternate embodiment of the present invention, steps 410 and 412 (instead of step 406) are executed after the completion of step 404. In accordance with this alternate embodiment of the present invention, the values of the texels in the 3D texture data set do not represent pure color or intensity values (or any other type of pure value or image attribute, such as lighting values and atmospheric effect values). Instead, the values of the texels in the 3D texture data set represent indices into look-up tables wherein the pure color or intensity values (or other pure values or image attributes) are stored in the look-up tables. The alternate embodiment provides several benefits. For example, the color space can usually be compressed into a small set of indices, thereby greatly increasing the available 3D texture data set size. Also, the color/intensity and opacity of the data can be modified without modifying the 3D texture data set by changing the look-up tables. This is useful for viewing data sets such as MRI scans in which each tissue type is to be tagged with a different index. In order to view different structures, the look-up table need only be modified to change the relative transparency of the different structures. Thus, the alternate embodiment of the present invention greatly increases the interactivity of such operations, and provides even greater benefits as the 3D texture data sets increase in size.

The look-up tables are preferably generated prior to execution of the steps in the flowcharts of FIGS. 3 and 4 using, for example, any well-known computer graphics system or workstation. For example, the look-up table for a particular 3D texture data set may be generated when the 3D texture data set itself is generated. Generation of a look-up table shall now be described in the context of an example.

As will be appreciated, a red/green/blue color combination is conventionally specified using 24 or more bits. Thus, it would be necessary to allocate 24 bits for each texel of a 3D texture data set if all $2^{24}$ color combinations were supported by the 3D texture data set. Assume, however, that only 256 color combinations occurred in the 3D texture data set. In accordance with the alternate embodiment of the present invention, the 24 bits associated with each of these 256 color combinations would be stored in a look-up table addressed by the index values. These index values would also be stored in the texels of the 3D texture data set in accordance with the respective color combinations associated with the texels. As will be appreciated, in accordance with the alternate embodiment of the present invention, only 8 bits would need to be allocated to each of the texels of the 3D texture data set, rather than 24.

Steps 410 and 412 of the alternate embodiment of the present invention shall now be described. In step 410, the values of the texels identified in step 404 are interpolated to generate an index into the look-up table for the pixel (recall that these texel values are themselves indices into the look-up table). Step 410 is similar to step 406, except that an index into the look-up table is generated, rather than a value of the pixel.

In step 412, the look-up table is accessed using the pixel index (generated in step 410) to thereby obtain a value for the pixel.

In the alternate embodiment of the present invention as just described, interpolation occurs before accessing the look-up table. In another embodiment of the present invention, the look-up table is accessed before performing the interpolation. Referring to the example shown in FIG. 6A, in accordance with this other embodiment the look-up table is accessed to obtain pure values for A, B, C, D, E, F, G, and H (the texel values represent indices into the look-up table in this other embodiment). The trilinear interpolation of Equation 36 is then performed to obtain the pixel value.

FIG. 5 presents a flowchart for sampling a 3D texture data set using a polygon in accordance with an additional embodiment of the present invention. This additional embodiment avoids aliasing artifacts.

Referring now to FIG. 5, in step 504 varying resolutions of texture volume data are preferably stored in a randomly accessible storage means, such as a random access memory (RAM). Preferably, the 3D texture image at LOD[0] is stored, the 1×1×1 texture image is stored, and all intermediate 3D texture images are stored. As will be appreciated by persons skilled in the art, the 3D texture images of resolution less than LOD[0] are obtained from the image at LOD[0] using well-known filtering operations.

In step 505, the orientation of the polygon (which is being used to sample the 3D texture data set) relative to the texture volume is defined. Step 505 is similar to step 304 of FIG. 3.

As discussed above, for each pixel of the polygon, the present invention operates to determine the value (for example, the intensity value, or the red/green/blue value) of the pixel based on the pixel's projection into the 3D texture data set. Such operation of the present invention is embodied in steps 506, 510, 512, and 514 of FIG. 5. For simplicity purposes, steps 506, 510, 512, and 514 are described below with respect to a single pixel of the polygon. It should be understood that steps 506, 510, 512, and 514 are performed for each pixel of the polygon.

In step 506, two of the 3D texture data sets (stored in step 504) are selected based on the level of detail of a particular pixel of the polygon. The selected 3D texture data sets are adjacent in resolution. One of the selected 3D texture data sets represents a slight magnification of the LOD of the pixel. The other selected 3D texture data set represents a slight minification of the LOD of the pixel. The manner in which the level of detail of a pixel is determined is described above. The manner in which the two 3D texture data sets are chosen, such that one is a magnification of the pixel LOD, and the other is a minification of the pixel LOD, is described above.

In step 510, the pixel is mapped into the selected 3D texture data sets. Step 510 is similar to step 306 in FIG. 3, except that texture coordinates of the pixel are determined for each of the selected 3D texture data sets. In other words, in step 510, step 306 is performed twice, once for each Of the selected 3D texture data sets.

In step 512, the value (for example, the intensity value, or the red/green/blue value) of the pixel is determined for each of the selected 3D texture data sets based on the pixel's respective mapping into the selected 3D texture data sets. Step 512 is similar to step 308 in FIG. 3, except that the value of the pixel is determined for each of the selected 3D texture data sets. In other words, in step 512, step 308 is performed twice, once for each of the selected 3D texture data sets. As a result of executing step 512, two values are generated, one associated with each of the selected 3D texture data sets.

In step 514, a final display value is generated for the pixel as a function of the two values calculated in step 512. Preferably, an interpolation is performed using the two values calculated in step 512 based on the relative proximity of the LOD of the pixel to the LODs of the selected 3D texture data sets. More particularly, the final display value is preferably generated in accordance with Equation 37:

$$V_{N+x}=V_N*(1-X)+V_{N+1}* X \quad \text{(Eq. 37)}$$

where $V_{N+x}$ is the value of the pixel (the pixel having an LOD of N+X), $V_N$ is the value associated with one of the selected 3D texture data sets (generated in step 512 and having an LOD of N), and $V_{N+1}$ is the value associated with the other selected 3D texture data set (also generated in step 512 and having an LOD of N+1).

Alternatively, when a look-up table is used as described above, two intermediate indexes are generated in Step 512. In step 514, Equation 37 is used to generate a final index from the two intermediate indexes. Then, the final index is used to access the lookup table and obtain the final display value.

Figure 8:
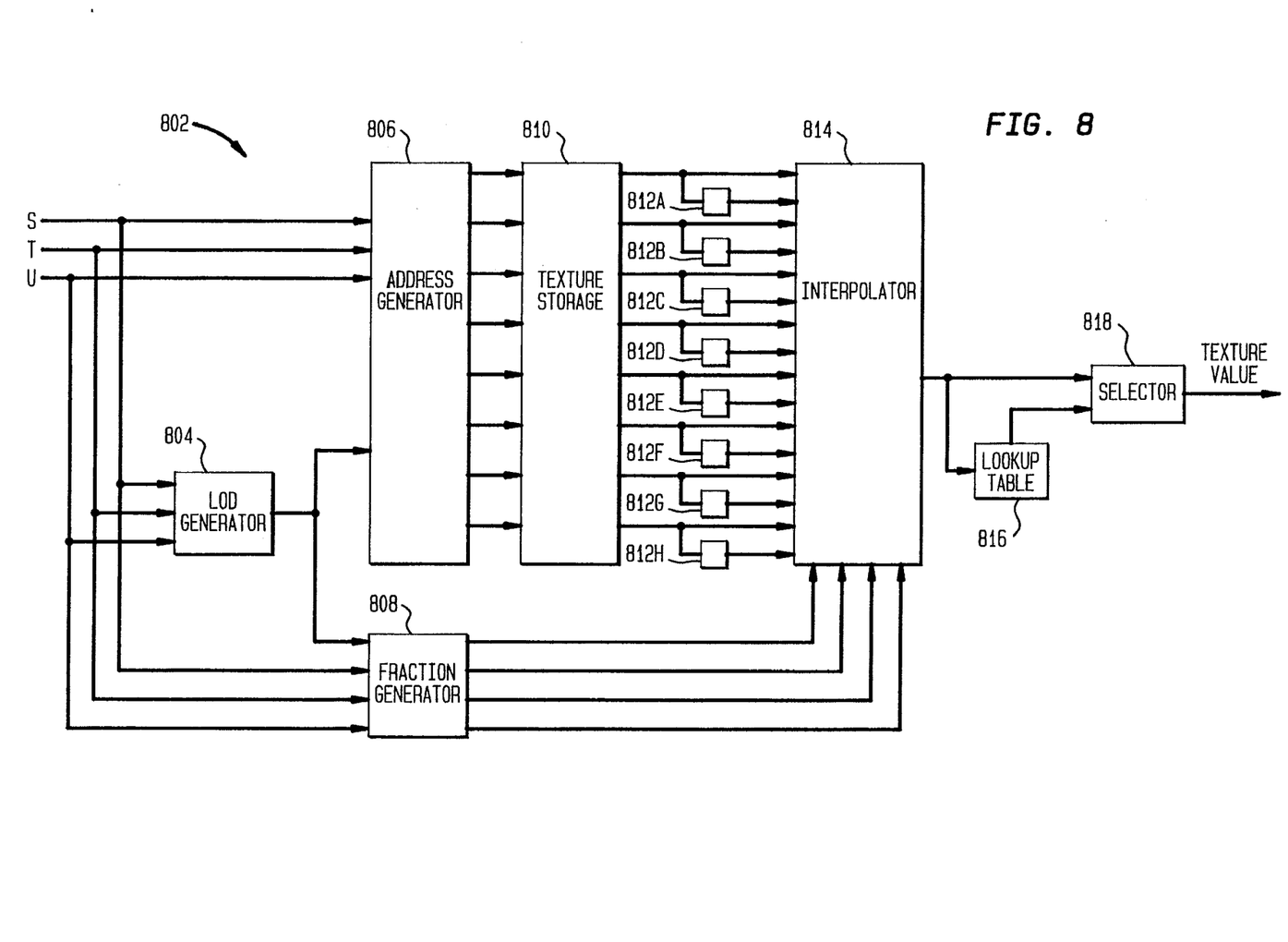
FIG. 8 is a block diagram of an apparatus for generating interactive computer graphic images incorporating three dimensional textures in accordance with a preferred embodiment of the present invention.

FIG. 8 is a block diagram of an apparatus 802 for generating interactive computer graphic images incorporating three dimensional textures in accordance with a preferred embodiment of the present invention. As described below, the apparatus 802 operates in accordance with the embodiments of the present invention as described above, and as depicted (for example) in FIGS. 3, 4, and 5.

The apparatus 802 includes a level of detail (LOD) generator 804, an address generator 806, a fraction generator 808, a texture storage device 810, eight holding registers 812A–812H an interpolator 814, a lookup table 816, and a selector 818. These components are described below.

(S, T, U) scaled object-space texture coordinate triples (generated using Equations 11, 12, and 13) are fed to the LOD generator 804 in groups of four, corresponding to a 2×2 arrangement of four pixels at screen-space coordinates (x,y), (x+1,y), (x+1,y+1), and (x,y+1). One LOD is generated for the four pixels by the LOD generator 804 (in accordance with Equations 14–20). Alternate embodiments are possible, for example, the LOD may be calculated uniquely for each pixel by performing the difference calculations of equations 14–19 at the four corners of each pixel rather than at the centers of four adjacent pixels.

During non-mip-mapped 3D texturing (that is, in the embodiment of the present invention as depicted in FIG. 3), for each pixel, the address generator 806 produces 8 texel addresses, corresponding to the eight nearest neighbors to the point in the 3D texture data set referred to by the scaled texture coordinates (S,T,U). The eight texel addresses in STU-space (that is, object-space) are:

(s,t,u)

(s+1,t,u)

(s,t+1,u)

(s+1,t+1,u)

(s,t,u+1)

(s+1,t,u+1)

(s,t+1,u+1)

(s+1,t+1,u+1)

where s=integer portion of S, t=integer portion of T, and u=integer portion of U.

Figure 9:
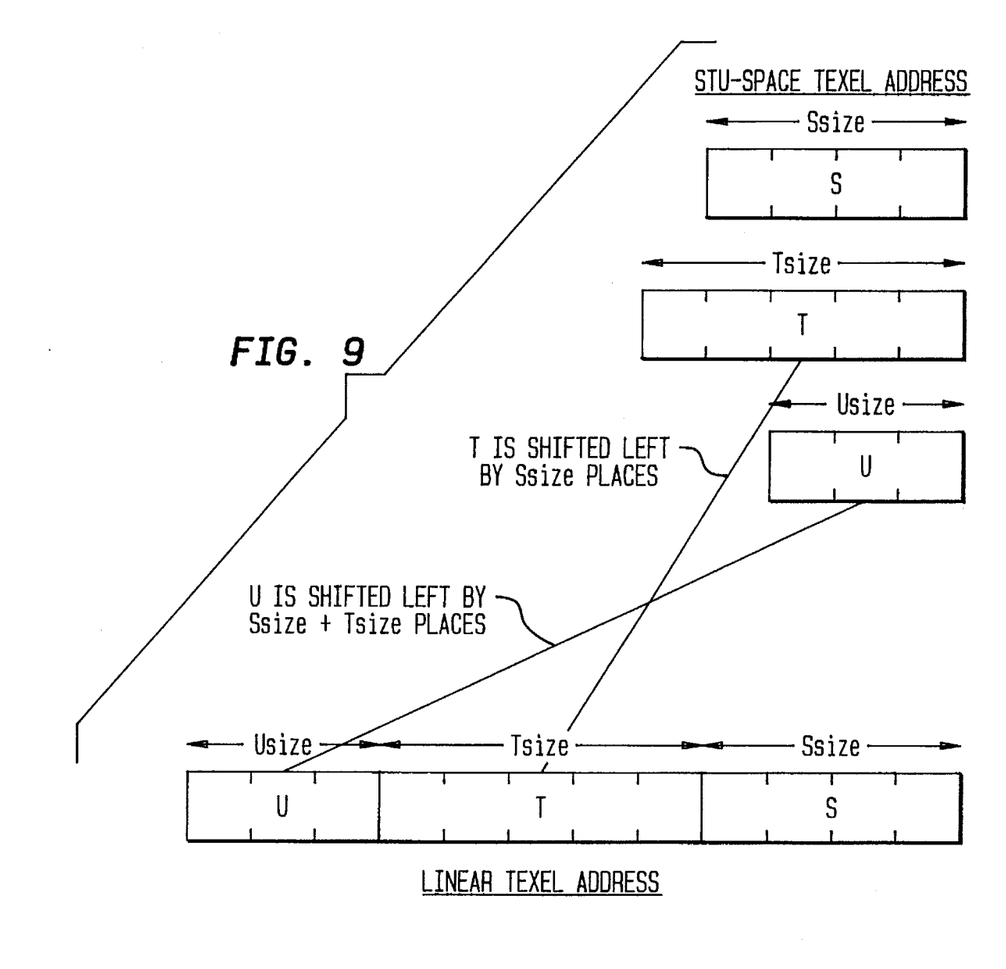
FIG. 9 illustrates a method of generating linear texel addresses in accordance with a preferred embodiment of the present invention.

The address generator 806 converts these STU-space addresses to linear addresses compatible with commonly available memory devices by shifting the T and U portions to the left, combining them with the S portion, and adding the base offset of the texture. This is illustrated in FIG. 9.

The fraction generator 808 extracts the fractional portions of S, T, and U as ds, dt, and du. ds, dt, and du are used by the Interpolator 814. It should be understood that ds, dt, and du are not the same as ds1, ds2, dr 1, etc., in Equations 14–19.

During mip-mapped 3D texturing (that is, in the embodiment of the present invention as depicted in FIG. 5), the address generator 806 calculates maplevel$_{fine}$ and maplevel$_{coarse}$ for each pixel (in accordance with Equations 21 and 22). The address generator 806 shifts the scaled texture coordinates (S,T,U) to the right by maplevel places (that is, by maplevel$_{fine}$ and maplevel$_{coarse}$) before calculating the eight nearest neighbors (as discussed above). Such right shifting is performed in order to rescale the texture coordinates to the selected map level. The operation of the address generator 806 as described above is performed in succession for both the coarse and fine map levels (to generate linear addresses from the STU-space addresses).

The fraction generator 808 extracts two sets of ds, dt, and du, one set for the coarse and one set for the fine map level. These are extracted from the fractional portions of S, T, and U after the right shift. The fraction generator 808 also computes maplevelfraction from LOD (in accordance with Equation 23).

The texture storage device 810 includes 8 commonly available semiconductor random-access memory (RAM) devices. During non-mip-mapped 3D texturing, for each pixel, the texture storage device 810 takes eight unique addresses (from the address generator 806) and retrieves eight texel values, one from each RAM.

The RAMs of the texture storage device 810 are arranged as eight banks, where each bank is assigned a specific set of texels as defined below:

| bank | assigned texels |
| --- | --- |
| 0 | even S, even T, even U |
| 1 | odd S, even T, even U |
| 2 | even S, odd T, even U |
| 3 | odd S, odd T, even U |
| 4 | even S, even T, odd U |
| 5 | odd S, even T, odd U |
| 6 | even S, odd T, odd U |
| 7 | odd S, odd T, odd U |

During mip-mapped 3D texturing, two sets of eight addresses are received in succession by the texture storage device 810 from the address generator 806. The first group of eight texels are looked up in the texture storage device 810 and the retrieved texture values are temporarily saved in the eight holding registers 812A–812H. Then, the next group of eight texels are looked up in the texture storage device 810 and the retrieved texture values corresponding to the second group of eight texels are presented to the interpolator 814 together with the values stored in the holding registers 812 (and corresponding to the first group of eight texels).

For mip-mapped 3D texturing, the RAM bank assignments are as follows:

| bank | assigned texels |
| --- | --- |
| 0 | even S, even T, even LOD |
| 1 | odd S, even T, even LOD |
| 2 | even S, odd T, even LOD |
| 3 | odd S, odd T, even LOD |
| 4 | even S, even T, odd LOD |
| 5 | odd S, even T, odd LOD |
| 6 | even S, odd T, odd LOD |
| 7 | odd S, odd T, odd LOD |

During non-mip-mapped 3D texturing, the interpolator 814 receives eight texel values. The interpolator 814 interpolates among the eight texel values to generate the value of the pixel in accordance with Equation 36. The interpolation fractions ds, dt, and du are received by the interpolator 814 from the fraction generator 808.

During mip-mapped 3D texturing, the interpolator 814 receives two groups of eight texels (as discussed above). Two independent sets of interpolation fractions ds, dt, and du are also received by the interpolator 814 from the fraction generator 808. Two 8-way interpolations (in accordance with Equation 36) are performed and the results of these two intermediate operations are combined in a 2-way interpolation (in accordance with Equation 37) to produce the final result (the fraction for this final interpolation is provided by the fraction generator 808).

The selector 818 is configured to pass the calculated texel value (calculated by the interpolator 814) directly on to the computer graphics system for further pixel processing. Alternatively, the selector 818 passes the result of a lookup-table operation to the computer graphics system.

The lookup table 816 is preferably implemented using a semiconductor random-access memory (RAM). The index (or address) to the lookup table 816 is the calculated texel value from the interpolator 814. The output of the lookup table 816 can be used, for example, as a 1, 2, 3 or 4 color component value.

The embodiment of the present invention as described above is preferably implemented using conventional hardware components, such as adders, inverters, multipliers, shifters, multiplexers, random access memories (RAM), read only memories (ROM), counters, clocks, and/or arithmetic logic units (ALU). Alternatively, the present invention is implemented using a programmable logic array (PLA), or using a custom integrated circuit chip. Implementation of the present invention will be apparent to persons skilled in the relevant art based on the description of the present invention contained herein.

In another embodiment, the present invention is implemented using a computer and software, wherein the software when executed in the computer enables the computer to operate in accordance with the present invention as discussed herein. The software is implemented to embody the operational features of the invention as discussed herein, such as (but not limited to) those operational features embodied in the flowcharts of FIGS. 3–5. Based on the disclosure of the invention contained herein, the structure and operation of the software will be apparent to persons skilled in the relevant art.

Extensions of the present invention will be apparent to persons skilled in the relevant art based on the discussion of the present invention contained herein. For example, when a two-dimensional texture is magnified beyond the level of detail of the base texture LOD[0], the resulting texture image will be out of focus (i.e., will lack sharpness) due to over-magnification. This problem may also be present to some degree when three-dimensional textures are magnified beyond the level of detail of the base texture LOD[0] (which is the highest resolution texture that is conventionally stored). Systems and methods for solving this problem with respect to two dimensional textures are discussed in a pending U.S. Patent Application entitled "A System and Method for Sharpening Texture Imagery in Computer Generated Interactive Graphics", cited above. Persons skilled in the relevant art will find it apparent to extend the systems and methods contained in this application to three dimensional textures based on the discussion contained herein regarding the computer graphics processing of three dimensional textures.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus for interactively generating computer graphic images incorporating three dimensional textures, comprising:

polygon orientation defining means for defining an orientation of a polygon relative to a plurality of three dimensional (3D) texture data sets, each of the 3D texture data sets being at a distinct level of detail;

level of detail determining means for determining a level of detail of a pixel associated with said polygon;

texture data set selecting means for selecting a first 3D texture data set and a second 3D texture data set from said plurality of 3D texture data sets in accordance with said pixel level of detail such that said first 3D texture data set represents a magnification of said pixel, and said second 3D texture data set represents a minification of said pixel;

pixel mapping means for mapping said pixel to a first position within said first 3D texture data set and a second position within said second 3D texture data set in accordance with said orientation; and pixel value generating means for generating a display value for said pixel in accordance with said mapping of said pixel to said first and second positions.

2. The apparatus of claim 1 in which dimensions of said 3D texture data sets are scaled to a predetermined range, said polygon orientation defining means comprising means for assigning three texture coordinates to each vertex of said polygon, each of said texture coordinates being within said predetermined range such that said polygon is similarly oriented relative to all of said 3D texture data sets.

3. The apparatus of claim 1, wherein said pixel mapping means comprises means for calculating scaled object-space three dimensional texture coordinates (S, T, U) for the pixel for each of said first and second 3D texture data sets in accordance with:

$S=(S/w)/(1/w)$ $T=(T/w)/(1/w)$ $U=(U/w)/(1/w)$ wherein S/w, T/w, and U/w represent scaled screen-space three dimensional texture coordinates and 1/w represents a perspective correction term.

4. The apparatus of claim 1, wherein said pixel value generating means comprises:

texel identifying means for identifying N texels of said first 3D texture data set surrounding said first position, and for identifying N texels of said second 3D texture data set surrounding said second position;

intermediate pixel value producing means for producing a first intermediate pixel value as a function of values associated with said identified texels of said first 3D texture data set, and for producing a second intermediate pixel value as a function of values associated with said identified texels of said second 3D texture data set; and display value producing means for producing said display value for said pixel as a function of said first and second intermediate pixel values.

5. The apparatus of claim 4, wherein said display value producing means comprises means for interpolating among said first and second intermediate pixel values to thereby produce said display value.

6. The apparatus of claim 4 in which each of said values associated with said identified texels of said first and second 3D texture data sets represents an image attribute, wherein said intermediate pixel value producing means comprises means for interpolating among said values associated with said identified texels of said first 3D texture data set to thereby produce said first intermediate pixel value, and for interpolating among said values associated with said identified texels of said second 3D texture data set to thereby produce said second intermediate pixel value.

7. The apparatus of claim 4, further comprising a table having a plurality of indexed entries, a distinct image attribute being stored in each of said indexed entries, each of said values associated with said identified texels of said first and second 3D texture data sets representing an index to said table, said intermediate pixel value producing means comprising:

means for interpolating among said values associated with said identified texels of said first 3D texture data set to produce a first interpolated index to said table, and for interpolating among said values associated with said identified texels of said second 3D texture data set to produce a second interpolated index to said table; and means for accessing said table using said first and second interpolated indices and for extracting image attributes from said table in accordance with said table accesses to thereby produce said first and second intermediate pixel values, said first and second intermediate pixel values being respectively set equal to said extracted image attributes.

8. The apparatus of claim 4, further comprising a table having a plurality of indexed entries, a distinct image attribute being stored in each of said indexed entries, each of said values associated with said identified texels of said first and second 3D texture data sets representing an index to said table, said intermediate pixel value producing means comprising:

means for accessing said table using said values associated with said identified texels of said first and second 3D texture data sets and for extracting image attributes from said table in accordance with said table accesses; and means for interpolating among said extracted image attributes to thereby produce said first and second intermediate pixel values.

9. A method of interactively generating computer graphic images incorporating three dimensional textures, comprising the steps of:

(a) defining an orientation of a polygon relative to a plurality of three dimensional (3D) texture data sets, each of the 3D texture data sets being at a distinct level of detail;

(b) determining a level of detail of a pixel associated with said polygon;

(c) selecting a first 3D texture data set and a second 3D texture data set from said plurality of 3D texture data sets in accordance with said pixel level of detail such that said first 3D texture data set represents a magnification of said pixel, and said second 3D texture data set represents a minification of said pixel;

(d) mapping said pixel to a first position within said first 3D texture data set and a second position within said second 3D texture data set in accordance with said orientation; and (e) generating a display value for said pixel in accordance with said mapping of said pixel to said first and second positions.

10. The method of claim 9 in which dimensions of said 3D texture data sets are scaled to a predetermined range, step (a) comprising the step of assigning three texture coordinates to each vertex of said polygon, each of said texture coordinates corresponding to a respective dimension of said 3D texture data sets and being within said predetermined range such that said polygon is similarly oriented relative to all of said 3D texture data sets.

11. The method of claim 9, wherein step (d) comprises the step of calculating scaled object-space three dimensional texture coordinates (S,T,U) for the pixel for each of said first and second 3D texture data sets in accordance with:

$S=(S/w)/(1/w)$ $T=(T/w)/(1/w)$ $U=(U/w)/(1/w)$ wherein S/w, T/w, and U/w represent scaled screen-space three dimensional texture coordinates and 1/w represents a perspective correction term.

12. The method of claim 9, wherein step (e) comprises the steps of:

(i) identifying N texels of said first 3D texture data set surrounding said first position, and N texels of said second 3D texture data set surrounding said second position;

(ii) producing a first intermediate pixel value as a function of values associated with said identified texels of said first 3D texture data set, and a second intermediate pixel value as a function of values associated with said identified texels of said second 3D texture data set; and (iii) producing said display value for said pixel as a function of said first and second intermediate pixel values.

13. The method of claim 12, wherein step (iii) comprises the step of interpolating among said first and second intermediate pixel values to thereby produce said display value.

14. The method of claim 12 in which each of said values associated with said identified texels of said first and second 3D texture data sets represents an image attribute, wherein step (ii) comprises the steps of:

interpolating among said values associated with said identified texels of said first 3D texture data set to thereby produce said first intermediate pixel value; and interpolating among said values associated with said identified texels of said second 3D texture data set to thereby produce said second intermediate pixel value.

15. The method of claim 12 in which a table having a plurality of indexed entries is defined, a distinct image attribute being stored in each of said indexed entries, each of said values associated with said identified texels of said first and second 3D texture data sets representing an index to said table, wherein step (ii) comprises the steps of:

interpolating among said values associated with said identified texels of said first 3D texture data set to produce a first interpolated index to said table, and among said values associated with said identified texels of said second 3D texture data set to produce a second interpolated index to said table; and accessing said table using said first and second interpolated indices and extracting image attributes from said table in accordance with said table accesses to thereby produce said first and second intermediate pixel values, said first and second intermediate pixel values being respectively set equal to said extracted image attributes.

16. The method of claim 12, in which a table having a plurality of indexed entries is defined, a distinct image attribute being stored in each of said indexed entries, each of said values associated with said identified texels of said first and second 3D texture data sets representing an index to said table, wherein step (ii) comprises the steps of:

accessing said table using said values associated with said identified texels of said first and second 3D texture data sets and extracting image attributes from said table in accordance with said table accesses; and interpolating among said extracted image attributes to thereby produce said first and second intermediate pixel values.

17. An apparatus for interactively generating computer graphic images incorporating three dimensional textures, comprising:

a storage device for storing a three dimensional (3D) texture data set, said storage device comprising N memory banks each storing a predetermined portion of said 3D texture data set;

polygon orientation defining means for defining an orientation of a polygon relative to said 3D texture data set;

pixel mapping means for mapping a pixel associated with said polygon to an object-space position within said 3D texture data set in accordance with said orientation;

texel identifying means for identifying N texels of said 3D texture data set surrounding said object-space position;

linear address generating means for generating linear addresses from object-space addresses associated with said identified texels;

means for obtaining N values associated with said identified texels by accessing said storage device using said linear addresses, one of said values being obtained from each of said memory banks; and pixel value generating means for generating a value for said pixel as a function of said values associated with said identified texels.

18. The apparatus of claim 17 in which said 3D texture data set is from a collection of images having varying levels of detail, dimensions of said images having said varying levels of detail being scaled to a predetermined range, said polygon orientation defining means comprising means for assigning three of texture coordinates to each vertex of said polygon, each of said texture coordinates corresponding to a respective dimension of images in said 3D texture data set and being within said predetermined range such that said polygon is similarly oriented relative to all of said images.

19. The apparatus of claim 17, wherein said pixel mapping means comprises means for calculating scaled object-space three dimensional texture coordinates (S, T, U) for the pixel in accordance with:

$$S=(S/w)/(1/w)$$

$$T=(T/w)/(1/w)$$

$$U=(U/w)/(1/w)$$

wherein S/w, T/w, and U/w represent scaled screen-space three dimensional texture coordinates and 1/w represents a perspective correction term.

20. The apparatus of claim 17 in which each of said values associated with said identified texels represents an image attribute, wherein said pixel value generating means comprises means for interpolating among said values associated with said identified texels to thereby produce said pixel value.

21. The apparatus of claim 17, further comprising a table having a plurality of indexed entries, a distinct image attribute being stored in each of said indexed entries, each of said values associated with said identified texels representing an index to said table, said pixel value generating means comprising:

means for interpolating among said values associated with said identified texels to produce an interpolated index to said table; and means for accessing said table using said interpolated index and for extracting an image attribute from said table in accordance with said table access to thereby produce said pixel value, said pixel value being set equal to said extracted image attribute.

22. The apparatus of claim 17, further comprising a table having a plurality of indexed entries, a distinct image attribute being stored in each of said indexed entries, said values associated with said identified texels representing indices to said table, said pixel value generating means comprising:

means for accessing said table using said values associated with said identified texels and for extracting image attributes from said table in accordance with said table access; and means for interpolating among said extracted image attributes to thereby produce said pixel value.

23. A method of interactively generating computer graphic images incorporating three dimensional textures, comprising the steps of:

(a) storing a three dimensional (3D) texture data set in a storage device comprising N memory banks each storing a predetermined portion of said 3D texture data set;

(b) defining an orientation of a polygon relative to said 3D texture data set;

(c) mapping a pixel associated with said polygon to an object-space position within said 3D texture data set in accordance with said orientation;

(d) identifying N texels of said 3D texture data set surrounding said object-space position;

(e) generating linear addresses from object-space addresses associated with said identified texels;

(f) obtaining N values associated with said identified texels by accessing said storage device using said linear addresses, one of said values being obtained from each of said memory banks; and (g) generating a value for said pixel as a function of said values associated with said identified texels.

24. The method of claim 23 in which said 3D texture data set is from a collection of images having varying levels of detail, dimensions of said images having said varying levels of detail being scaled to a predetermined range, step (b) comprising the step of assigning three texture coordinates to each vertex of said polygon, each of said texture coordinates corresponding to a respective dimension of images in said 3D texture data set and being within said predetermined range such that said polygon is similarly oriented relative to all of said images.

25. The method of claim 23, wherein step (c) comprises the step of calculating scaled object-space three dimensional texture coordinates (S, T, U) for the pixel in accordance with:

$$S=(S/w)/(1/w)$$

$$T=(T/w)/(1/w)$$

$$U=(U/w)/(1/w)$$

wherein S/w, T/w, and U/w represent scaled screen-space three dimensional texture coordinates and 1/w represents a perspective correction term.

26. The method of claim 23 in which each of said values associated with said identified texels represents an image attribute, wherein step (g) comprises the step of interpolating among said values associated with said identified texels to thereby produce said pixel value.

27. The method of claim 23 in which a table having a plurality of indexed entries is defined, a distinct image attribute being stored in each of said indexed entries, each of said values associated with said identified texels representing an index to said table, wherein step (g) comprises the steps of:

interpolating among said values associated with said identified texels to produce an interpolated index to said table; and accessing said table using said interpolated index and extracting an image attribute from said table in accordance with said table access to thereby produce said pixel value, said pixel value being set equal to said extracted image attribute.

28. The method of claim 23 in which a table having a plurality of indexed entries is defined, a distinct image attribute being stored in each of said indexed entries, said values associated with said identified texels representing indices to said table, wherein step (g) comprises the steps of:

accessing said table using said values associated with said identified texels and extracting image attributes from said table in accordance with said table access; and interpolating among said extracted image attributes to thereby produce said pixel value.

29. An apparatus for interactively generating computer graphic images incorporating three dimensional textures, comprising:

polygon orientation defining means for defining an orientation of a polygon relative to a three dimensional (3D) texture data set;

pixel mapping means, coupled to said polygon orientation defining means, for mapping a pixel associated with said polygon to a position within said 3D texture data set in accordance with said orientation;

storage means for storing a plurality of entries, a distinct image attribute being stored in each of said entries;

texel identifying means for identifying N texels of said 3D texture data set surrounding said position, each of said texels being associated with a value representing an address to said storage means;

means for interpolating among values associated with said identified texels to produce an interpolated address to said storage means; and means for extracting an image attribute from said storage means using said interpolated address to thereby produce a value for said pixel, said pixel value being set equal to said extracted image attribute.

* * * * *